United States Patent
Freeman et al.

(10) Patent No.: US 10,120,371 B2
(45) Date of Patent: Nov. 6, 2018

(54) METHOD AND SYSTEM FOR AUTOMATICALLY SEQUENCING HOLE DRILLING OPERATIONS SUPPORTING ONE-UP ASSEMBLY

(71) Applicant: The Boeing Company, Chicago, IL (US)

(72) Inventors: Philip L. Freeman, Summerville, SC (US); Matthew John Miller, Ladson, SC (US); Shaun Condie, Mt. Pleasant, SC (US)

(73) Assignee: THE BOEING COMPANY, Chicago, IL (US)

( * ) Notice: Subject to any disclaimer, the term of this patent is extended or adjusted under 35 U.S.C. 154(b) by 441 days.

(21) Appl. No.: 14/753,670

(22) Filed: Jun. 29, 2015

(65) Prior Publication Data

US 2016/0378093 A1    Dec. 29, 2016

(51) Int. Cl.
*G06F 19/00* (2018.01)
*G05B 19/418* (2006.01)

(52) U.S. Cl.
CPC .......... *G05B 19/41805* (2013.01); *G05B 2219/31031* (2013.01); *G05B 2219/31068* (2013.01); *G05B 2219/49175* (2013.01); *G05B 2219/50126* (2013.01)

(58) Field of Classification Search
CPC ................................. G05B 19/41805
USPC .................. 700/95, 97, 99, 106, 108
See application file for complete search history.

(56) References Cited

U.S. PATENT DOCUMENTS

| | | | | |
|---|---|---|---|---|
| 4,310,964 A * | 1/1982 | Murphy | ............. | B21J 15/10 |
| | | | | 29/281.1 |
| 9,486,917 B2 * | 11/2016 | Reid | ............. | B25J 11/005 |
| 9,533,384 B1 * | 1/2017 | McCallum | ............. | B23P 11/00 |
| 2013/0144416 A1 * | 6/2013 | Rataul | ............. | G05B 19/41805 |
| | | | | 700/95 |
| 2014/0081442 A1 * | 3/2014 | Chang | ............. | G06F 17/50 |
| | | | | 700/108 |

OTHER PUBLICATIONS

Author Unknown, "Approximate Nearest Neighbors", Computational Robotics, http://faculty.cua.edu/plaku/ResearchANN.html, accessed Jun. 29, 2015, pp. 1-2.

* cited by examiner

*Primary Examiner* — Mohammad Ali
*Assistant Examiner* — Sheela Rao
(74) *Attorney, Agent, or Firm* — MH2 Technology Law Group LLP

(57) ABSTRACT

A method, a device, and a computer-readable storage medium is provided for performing the method for automating an assembling sequence operation for a workpiece using an one-up assembly process that uses adjacent hole clamping. The method can include obtaining an adjacency list from points for the workpiece to be assembled; controlling an assembly machine for assembling the workpiece using a sequence of assembly operations based on the adjacency list; identifying potential errors in the sequence of assembly operations; determining a revised sequence of assembly operations based on the potential errors that are identified; and controlling the assembly machine based on the revised sequence of assembly operations.

21 Claims, 18 Drawing Sheets

| # | Command TEXT | Status |
|---|---|---|
| 0 | Speed (30) | |
| 1 | Apply Transform (nominal_aj_stand) | |
| 2 | DrillCsk Hole 1 | |
| 3 | DrillCsk Hole 2 | |
| 4 | DrillCsk Hole 3 | Adjacency Requirements Not Met |
| 5 | SyncDrillCsk Hole 4 | |
| 6 | DrillCsk Hole 5 | |
| 7 | DrillCsk Hole 6 | Adjacency Requirements Not Met |
| 8 | DrillCsk Hole 7 | |
| 9 | DrillCsk Hole 8 | Adjacency Requirements Not Met |
| 10 | DrillCsk Hole 9 | Adjacency Requirements Not Met |
| 11 | DrillCsk Hole 10 | Adjacency Requirements Not Met |
| 12 | DrillCsk Hole 11 | |
| 13 | SyncDrillCsk Hole 12 | |
| 14 | DrillCsk Hole 13 | |
| 15 | DrillCsk Hole 14 | |
| 16 | DrillCsk Hole 15 | Adjacency Requirements Not Met |
| 17 | SyncDrillCsk Hole 16 | |
| 18 | DrillCsk Hole 17 | Adjacency Requirements Not Met |
| 19 | DrillCsk Hole 18 | Adjacency Requirements Not Met |
| 20 | DrillCsk Hole 19 | Adjacency Requirements Not Met |
| 21 | DrillCsk Hole 20 | Adjacency Requirements Not Met |

FIG. 3A

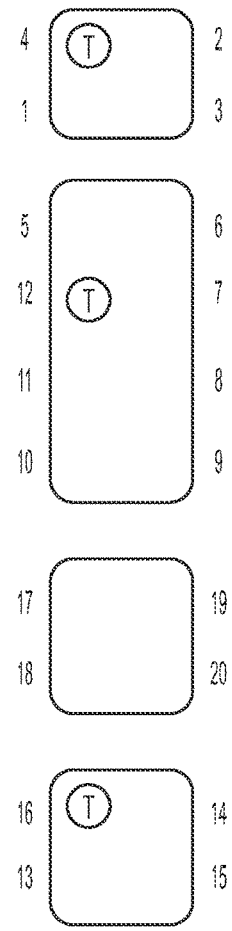

FIG. 3B

| # | Command TEXT | Status |
|---|---|---|
| 0 | Speed (30) | Complete |
| 1 | Apply Transform (nominal_aj_stand) | Complete |
| 2 | DrillCsk Hole 1 | Complete |
| 3 | DrillCsk Hole 2 | Complete |
| 4 | DrillCsk Hole 3 | Complete |
| 5 | SyncDrillCsk Hole 4 | Complete |
| 6 | DrillCsk Hole 5 | |
| 7 | DrillCsk Hole 6 | |
| 8 | DrillCsk Hole 7 | |
| 9 | DrillCsk Hole 8 | Adjacency Requirements Not Met |
| 10 | DrillCsk Hole 9 | Adjacency Requirements Not Met |
| 11 | DrillCsk Hole 10 | Adjacency Requirements Not Met |
| 12 | DrillCsk Hole 11 | |
| 13 | SyncDrillCsk Hole 12 | |
| 14 | DrillCsk Hole 13 | |
| 15 | DrillCsk Hole 14 | |
| 16 | DrillCsk Hole 15 | Adjacency Requirements Not Met |
| 17 | SyncDrillCsk Hole 16 | |
| 18 | DrillCsk Hole 17 | Adjacency Requirements Not Met |
| 19 | DrillCsk Hole 18 | Adjacency Requirements Not Met |
| 20 | DrillCsk Hole 19 | Adjacency Requirements Not Met |
| 21 | DrillCsk Hole 20 | Adjacency Requirements Not Met |

FIG. 5A

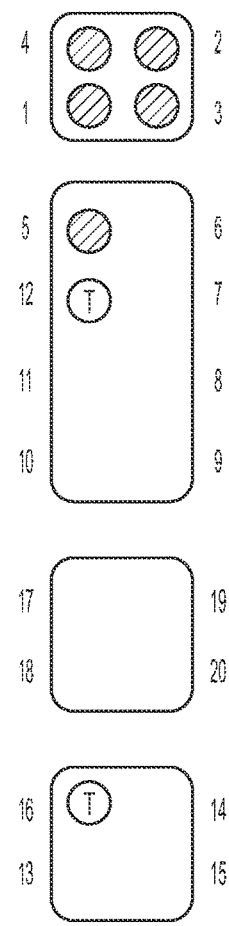

FIG. 5B

| # | Command TEXT | Status |
|---|---|---|
| 0 | Speed (30) | Complete |
| 1 | Apply Transform (nominal_aj_stand) | Complete |
| 2 | DrillCsk Hole 1 | Complete |
| 3 | DrillCsk Hole 2 | Complete |
| 4 | DrillCsk Hole 3 | Complete |
| 5 | SyncDrillCsk Hole 4 | Complete |
| 6 | DrillCsk Hole 5 | Complete |
| 7 | DrillCsk Hole 6 | Complete |
| 8 | *DrillCsk Hole 7* | Abort |
| 9 | DrillCsk Hole 8 | Adjacency Requirements Not Met |
| 10 | DrillCsk Hole 9 | Adjacency Requirements Not Met |
| 11 | DrillCsk Hole 10 | Adjacency Requirements Not Met |
| 12 | DrillCsk Hole 11 | |
| 13 | SyncDrillCsk Hole 12 | |
| 14 | DrillCsk Hole 13 | |
| 15 | DrillCsk Hole 14 | |
| 16 | DrillCsk Hole 15 | Adjacency Requirements Not Met |
| 17 | SyncDrillCsk Hole 16 | |
| 18 | DrillCsk Hole 17 | Adjacency Requirements Not Met |
| 19 | DrillCsk Hole 18 | Adjacency Requirements Not Met |
| 20 | DrillCsk Hole 19 | Adjacency Requirements Not Met |
| 21 | DrillCsk Hole 20 | Adjacency Requirements Not Met |

FIG. 6A

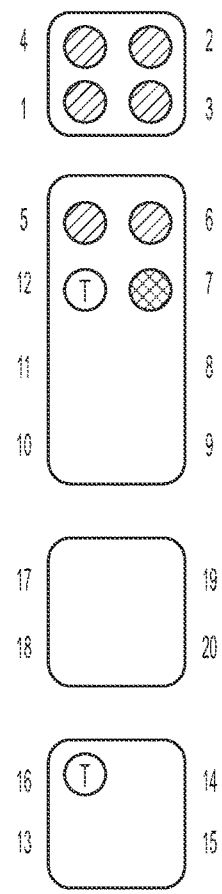

FIG. 6B

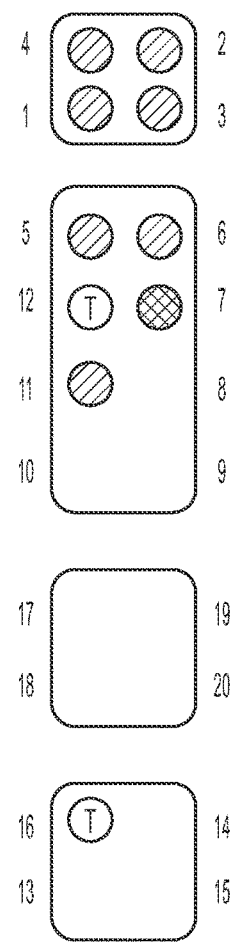

| # | Command TEXT | Status |
|---|---|---|
| 0 | Speed (30) | Complete |
| 1 | Apply Transform (nominal_aj_stand) | Complete |
| 2 | DrillCsk Hole 1 | Complete |
| 3 | DrillCsk Hole 2 | Complete |
| 4 | DrillCsk Hole 3 | Complete |
| 5 | SyncDrillCsk Hole 4 | Complete |
| 6 | DrillCsk Hole 5 | Complete |
| 7 | DrillCsk Hole 6 | Complete |
| 8 | *DrillCsk Hole 7* | *Abort* |
| 9 | *DrillCsk Hole 8* | |
| 10 | *DrillCsk Hole 9* | *Adjacency Requirements Not Met* |
| 11 | *DrillCsk Hole 10* | |
| 12 | DrillCsk Hole 11 | Complete |
| 13 | *SyncDrillCsk Hole 12* | |
| 14 | *DrillCsk Hole 13* | |
| 15 | *DrillCsk Hole 14* | |
| 16 | *DrillCsk Hole 15* | *Adjacency Requirements Not Met* |
| 17 | *SyncDrillCsk Hole 16* | |
| 18 | *DrillCsk Hole 17* | *Adjacency Requirements Not Met* |
| 19 | *DrillCsk Hole 18* | *Adjacency Requirements Not Met* |
| 20 | *DrillCsk Hole 19* | *Adjacency Requirements Not Met* |
| 21 | *DrillCsk Hole 20* | *Adjacency Requirements Not Met* |

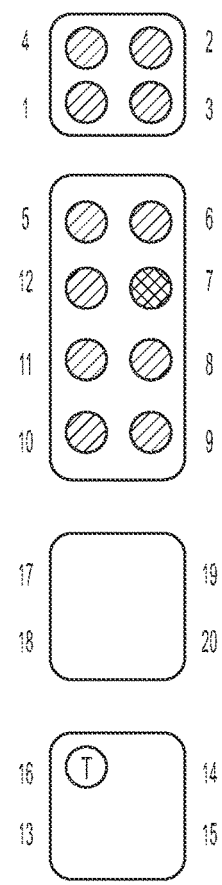

| # | Command TEXT | Status |
|---|---|---|
| 0 | Speed (30) | Complete |
| 1 | Apply Transform (nominal_aj_stand) | Complete |
| 2 | DrillCsk Hole 1 | Complete |
| 3 | DrillCsk Hole 2 | Complete |
| 4 | DrillCsk Hole 3 | Complete |
| 5 | SyncDrillCsk Hole 4 | Complete |
| 6 | DrillCsk Hole 5 | Complete |
| 7 | DrillCsk Hole 6 | Complete |
| 8 | DrillCsk Hole 7 | Abort |
| 9 | DrillCsk Hole 8 | Complete |
| 10 | DrillCsk Hole 9 | Complete |
| 11 | DrillCsk Hole 10 | Complete |
| 12 | DrillCsk Hole 11 | Complete |
| 13 | SyncDrillCsk Hole 12 | Complete |
| 14 | DrillCsk Hole 13 | |
| 15 | DrillCsk Hole 14 | |
| 16 | DrillCsk Hole 15 | Adjacency Requirements Not Met |
| 17 | SyncDrillCsk Hole 16 | |
| 18 | DrillCsk Hole 17 | Adjacency Requirements Not Met |
| 19 | DrillCsk Hole 18 | Adjacency Requirements Not Met |
| 20 | DrillCsk Hole 19 | Adjacency Requirements Not Met |
| 21 | DrillCsk Hole 20 | Adjacency Requirements Not Met |

FIG. 8A  FIG. 8B

| # | Command TEXT | Status |
|---|---|---|
| 0 | Speed (30) | Complete |
| 1 | Apply Transform (nominal_aj_stand) | Complete |
| 2 | DrillCsk Hole 1 | Complete |
| 3 | DrillCsk Hole 2 | Complete |
| 4 | DrillCsk Hole 3 | Complete |
| 5 | SyncDrillCsk Hole 4 | Complete |
| 6 | DrillCsk Hole 5 | Complete |
| 7 | DrillCsk Hole 6 | Complete |
| 8 | *DrillCsk Hole 7* | *Abort* |
| 9 | DrillCsk Hole 8 | Complete |
| 10 | DrillCsk Hole 9 | Complete |
| 11 | DrillCsk Hole 10 | Complete |
| 12 | DrillCsk Hole 11 | Complete |
| 13 | SyncDrillCsk Hole 12 | Complete |
| 14 | DrillCsk Hole 13 | Complete |
| 15 | DrillCsk Hole 14 | |
| 16 | DrillCsk Hole 15 | |
| 17 | SyncDrillCsk Hole 16 | |
| 18 | *DrillCsk Hole 17* | *Adjacency Requirements Not Met* |
| 19 | *DrillCsk Hole 18* | *Adjacency Requirements Not Met* |
| 20 | *DrillCsk Hole 19* | *Adjacency Requirements Not Met* |
| 21 | *DrillCsk Hole 20* | *Adjacency Requirements Not Met* |

FIG. 9A

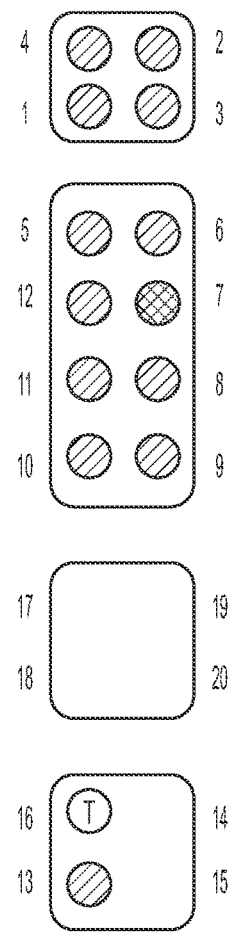

FIG. 9B

| # | Command TEXT | Status |
|---|---|---|
| 0 | Speed (30) | Complete |
| 1 | Apply Transform (nominal_aj_stand) | Complete |
| 2 | DrillCsk Hole 1 | Complete |
| 3 | DrillCsk Hole 2 | Complete |
| 4 | DrillCsk Hole 3 | Complete |
| 5 | SyncDrillCsk Hole 4 | Complete |
| 6 | DrillCsk Hole 5 | Complete |
| 7 | DrillCsk Hole 6 | Complete |
| 8 | *DrillCsk Hole 7* | *Abort* |
| 9 | DrillCsk Hole 8 | Complete |
| 10 | DrillCsk Hole 9 | Complete |
| 11 | DrillCsk Hole 10 | Complete |
| 12 | DrillCsk Hole 11 | Complete |
| 13 | SyncDrillCsk Hole 12 | Complete |
| 14 | DrillCsk Hole 13 | Complete |
| 15 | DrillCsk Hole 14 | Complete |
| 16 | DrillCsk Hole 15 | |
| 17 | SyncDrillCsk Hole 16 | |
| 18 | DrillCsk Hole 17 | |
| 19 | DrillCsk Hole 18 | |
| 20 | DrillCsk Hole 19 | |
| 21 | DrillCsk Hole 20 | |

FIG. 10A

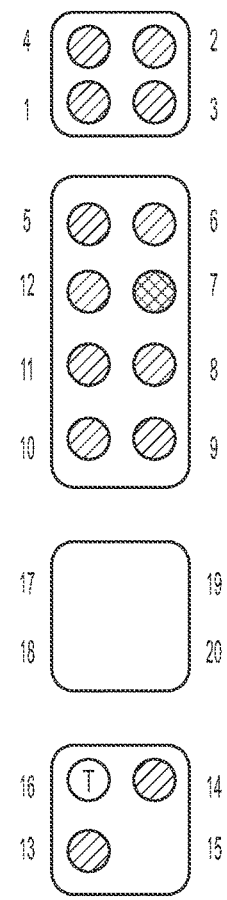

FIG. 10B

METHOD AND SYSTEM FOR AUTOMATICALLY SEQUENCING HOLE DRILLING OPERATIONS SUPPORTING ONE-UP ASSEMBLY

FIELD

The present disclosure relates generally to manufacturing and, in particular, to a method and apparatus for processing a workpiece. Still more particularly, the present disclosure relates to a method and apparatus for clamping a workpiece while perform operations on the workpiece.

BACKGROUND

In assembling structures such as those for an aircraft, rivets and/or other types of fasteners may be installed to attach parts to each other. These types of fasteners may be installed into airframe structures. The airframe structures include, for example, without limitation, wing and fuselage skins, supporting structures, and/or other suitable structures.

It is desirable to perform the drilling of holes and insertion of fasteners using a one-up assembly process. A one-up assembly process involves assembling the layers of the workpiece at one time. These layers are parts that are to be fastened to each other without having to take the layers apart during the assembly process. For example, a skin panel may be fastened to a spar or spar cap. These parts make up the layers in the workpiece. In another example, a skin panel may be attached to a frame of a fuselage. These parts also form a workpiece.

After the parts have been put together to form a workpiece, operations may be performed on the workpiece. For example, the workpiece is drilled, inspected, and fastened without the removal (or separation) of layers from each other for other operations, such as deburring, cleaning, sealing, and other suitable operations.

With currently used systems, the drilling forces may cause inconsistencies in the workpiece, gaps between layers in the workpiece, and burrs that may be undesirable. As a result, one common process to assemble these types of aircraft structures involves placing the components in a clamping device, such as a jig. Parts, such as skin panels, spars, and/or ribs, are loaded into a jig to form the layers in the workpiece. Holes are then drilled through the parts. Thereafter, the parts are disassembled for other operations, such as deburring and cleanup. The parts are reassembled with sealants and/or fasteners.

This type of process uses equipment and floor space. Further, the process of drilling holes, disassembling the parts, and then reassembling the parts increases the time needed to assemble a wing as compared to using a one-up process. As a result, currently used processes may have increased time and/or expense that may be undesirable with respect to manufacturing aircraft or other large structures.

Thus, it would be advantageous to have a method and apparatus that takes into account at least one of the issues discussed above, as well as possibly other issues.

SUMMARY

According to aspects consistent with the present teachings, a method of for automating an assembling sequence operation for a workpiece using a one-up assembly process that uses adjacent hole clamping is disclosed. The method can comprise obtaining an adjacency list from points for the workpiece to be assembled; controlling an assembly machine for assembling the workpiece using a sequence of assembly operations based on the adjacency list; identifying potential errors in the sequence of assembly operations; determining a revised sequence of assembly operations based on the potential errors that are identified; and controlling the assembly machine based on the revised sequence of assembly operations.

In some aspects, the method can further comprise creating the adjacency list and the sequence of assembly operations. Creating the adjacency list and the sequence of assembly operations can further comprises assigning points to be assembled on the workpiece to groups; and establishing adjacency between the groups that are assigned.

In some aspects, the assembly machine can be operable to perform drilling and fastening operations.

In some aspects, the adjacency list is based on distance between the points, a stack-up arrangement of the workpiece, or combinations thereof. Adjacency may also be determined through testing or by whatever the process requirements are.

In some aspects, obtaining the adjacency list further can comprise identifying the points assigned to a computer-aided design software.

In some aspects, the adjacency list can be based on adjacency relative to a hole in the workpiece having a fastener or a hole having clamping sufficient to maintain a position of the workpiece.

In some aspects, the potential errors can comprise an incomplete or inaccurate drilling or fastening operation or absences of parts.

In some aspects, the adjacency list can be obtained using a computer-aided design software depiction of the workpiece.

According to aspects consistent with the present teachings, a device is disclosed that comprises a memory containing instructions; and at least one processor, operably connected to the memory, that executes the instructions to perform method for automating an assembling sequence operation for a workpiece using an one-up assembly process that uses adjacent hole clamping, the method comprising: obtaining an adjacency list from points for the workpiece to be assembled; controlling an assembly machine for assembling the workpiece using a sequence of assembly operations based on the adjacency list; identifying potential errors in the sequence of assembly operations; determining a revised sequence of assembly operations based on the potential errors that are identified; and controlling the assembly machine based on the revised sequence of assembly operations.

According to aspects consistent with the present teachings, a computer readable storage medium is disclosed that comprises instructions for causing one or more processors to perform a method for automating an assembling sequence operation for a workpiece using an one-up assembly process that uses adjacent hole clamping, the method comprising: obtaining an adjacency list from points for the workpiece to be assembled; controlling an assembly machine for assembling the workpiece using a sequence of assembly operations based on the adjacency list; identifying potential errors in the sequence of assembly operations; determining a revised sequence of assembly operations based on the potential errors that are identified; and controlling the assembly machine based on the revised sequence of assembly operations.

BRIEF DESCRIPTION OF THE DRAWINGS

The accompanying drawings, which are incorporated in and constitute a part of this specification, illustrate embodiments of the disclosure and together with the description, serve to explain the principles of the disclosure. In the figures:

FIG. 3A shows an example program display 300 for the sequence of FIGS. 2A-2C prior to any work is completed.

FIG. 3B shows a view of FIG. 2C without the adjacency graphs and shows the condition of assembly of the example assembly structure.

FIGS. 5A and 5B are similar to FIGS. 3A and 3B, and show the holes 1-5 has completed drilling.

FIGS. 6A and 6B are similar to FIGS. 3A and 3B, and show that after attempting to drill hole 7, no fastener installation occurred.

FIGS. 7A and 7B are similar to FIGS. 3A and 3B, and show that after drilling hole 11, holes 8 and 10 can now be drilled if the operator were to restart the program from the beginning.

FIGS. 8A and 8B are similar to FIGS. 3A and 3B, and show that after the operator starts the program over from the top and the second shear tie is finished.

FIGS. 9A and 9B are similar to FIGS. 3A and 3B, and show that after hole 13 is drilled, hole 15 is now able to be drilled.

FIGS. 10A and 10B are similar to FIGS. 3A and 3B, and show that after drilling hole 14, holes 17-20 can now be drilled since the adjacency groups are sufficiently fastened.

DETAILED DESCRIPTION

Figure 1:
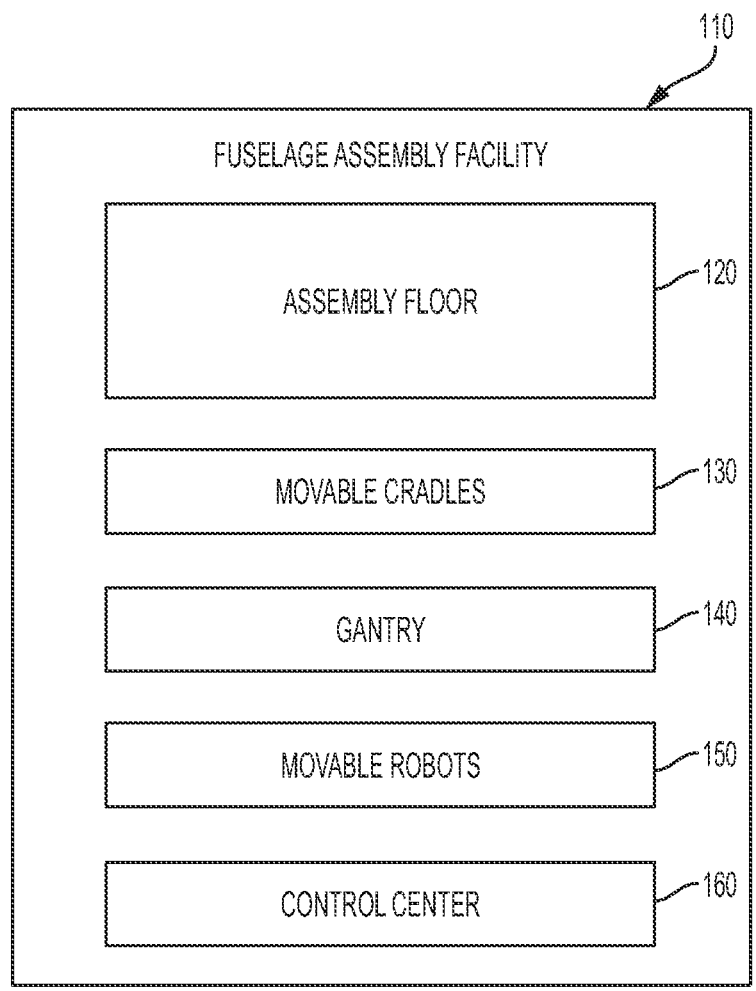
FIG. 1 is an illustration of a facility for assembling aircraft fuselages.

Exemplary embodiments are discussed in detail below. While specific exemplary embodiments are discussed, it should be understood that this is done for illustration purposes only. In describing and illustrating the exemplary embodiments, specific terminology is employed for the sake of clarity. However, the described is not intended to be limited to the specific terminology so selected. A person skilled in the relevant art will recognize that other components and configurations may be used without parting from the spirit and scope of the invention. It is to be understood that each specific element includes all technical equivalents that operate in a similar manner to accomplish a similar purpose. Each reference cited herein is incorporated by reference. The examples and embodiments described herein are non-limiting examples.

Definitions

Point—A location with a unique name where a fastener will be installed. In this document, points are denoted by lower case italicized letters (e.g. a, b, c).

Group—A collection of points with a unique name. Typically, a shear tie will be the basis for a group. However, there may be reasons to split fasteners of a single shear tie across multiple groups. A group is independent of a program. For example, the points in a group may be processed by different programs. In this document, Groups are denoted by bold capital letters (e.g. A, B, C).

Adjacent—A relationship between points and groups. Adjacency is directional (e.g. point a may be adjacent to point b, while point b is not adjacent to point a).

Adjacency List—A list, associated with a point (or group), of the adjacent points (or groups).

Adjacency Graph—The pictoral representation of all adjacency relationships between points (or groups).

There are some assemblies where hole drilling is dependent on clamp up of previous drilling/fastening. Traditionally, automation is given the explicit sequence of operations to follow. If an error happens with hole drilling, the typical sequence of events is to recover from the error and then proceed to the next automation step in the sequence. In automated OUA, it may be a violation of the one-up requirements to proceed to the next step if the previous step had an error (e.g. the fastening process was unsuccessful). Currently, there exists NC programming that provides a sequence for the drilling and fastening of holes. The current programming does not consider situations where the fastening was unsuccessful, thus, unless caught by the machine operator, the drilling and fastening will continue the sequence. If drilling and fastening continues the sequence, and that sequence violates the One UP Assembly process and the error is caught at a later point, the assembly must be disassembled, cleaned and restarted. Thus, a mistake could be very costly. In view of the foregoing, aspects of the present disclosure relates to the One up Assembly process that uses clamp up of previous drilling/fastening operation. Aspects of the present disclosure provide for the identification of errors, such as unsuccessful hole fastening and the identification of alternative paths consistent with the one up assembly process to allow for the machine to continue with the assembly.

Generally speaking, aspects of the present disclosure provide a numerical control program that can perform a method of identifying alternative sequences in the One Up Assembly Process including providing an adjacency list from points in a CAD software (considering both distance and stack up); performing drilling and fastening according to the adjacency list/sequence; identifying potential errors in the drilling and fasting sequence; and identifying revised sequences based on the errors. The sequence can be automatically generated by the software and provides a display to allow for user modification of the sequence. The machine will follow the sequence and automatically revise that sequence if there are any errors identified by the automated system. Alternatively or additionally, the method of automating a hole drilling sequence operation for a one-up assembly that uses adjacent hole clamping can include identifying points assigned in a CAD software; determining an adjacency list; controlling a drilling machine for drilling and fastening based on the adjacency list; identifying potential errors in the drilling and fastening sequence; and controlling the drilling machine based on the adjacency list.

Aspects consistent with the present disclosure provide for an automated drilling system to automatically sequence the hole drilling operations for a one-up assembly process ("OUA") that uses adjacent hole clamping. The system can include an automated drilling system, a planned sequence of work including holes and existing tack fasteners, and a set of adjacency conditions that establish which holes are adjacent to other holes. The system operating the method can traverse the planned work and ensure that no holes are drilled that do not have sufficient adjacent hole clamp up and can re-sequence the work as needed to ensure that adjacent hole clamp-up conditions are satisfied. The present system can efficiently map the assembly constraints consistent with a complex OUA requirement for adjacent hole clamping. Thus, the automation can automatically determine which of the remaining processes steps are allowed per the OUA requirements, and proceed to a permitted step, rather than simply the next step in the sequence.

Currently, OUA requirements are first met by carefully scripting out the sequence of assembly operations (e.g. the drilling and fastening of the part). This can result in inefficient assembly sequences. For example, drilling and clamping a large number of holes at a pilot diameter to get sufficient clamp up prior to full size drilling, and then returning after full size drilling to drill the pilot holes to full size. Also, if there is an error on the automation that causes a failure of one of the assembly steps (e.g. couldn't drill the hole, couldn't complete the fastening operation, or there is an absences of parts) then the operator must have sufficient knowledge of both the NC Program and the OUA requirements to carefully sequence the automation to the next permitted operation, rather than simply the next operation. Failing to adhere to OUA requirements can result in quality defects on our aircraft and the need to disassemble and inspect the assembly, which may be as large as a full sized fuselage frame.

Aspects of the present disclosure provides for a directed graph (in the sense of a set of vertices and edges) at two or more hierarchies to automatically determine if the OUA requirements are met for a given operation. If the OUA requirements are not met, then the automation will not perform the operation. Moreover, the automation can search the list of uncompleted operations and find an available permitted operation to re-sequence the work in accordance with the OUA requirements. By allowing the automation to automatically find a feasible sequence of operations, the automation can be much more robust to failure. A failure of a single operation is unlikely to cause a complete stopping and reprogramming of the part sequence, as the automation can recalculate a feasible alternate sequence. Further, these tools can enable the off-line programmer (NC Programming) to automatically find feasible sequences of operations that can be used as the initial sequencing plan and are guaranteed to satisfy the OUA requirements.

The present system can be used by a program, such as a Computer Aided Three-dimensional Interactive Application ("CATIA") program, to enable an operator, such as a numerical control ("NC") programmer, to complete the following actions for clamping a workpiece while performing operations on the workpiece. The workpiece can include multiple layers or stacks of parts that are to be assembled using a one-up assembly technique. First, the operator can assign/reassign points to groups. The operator can create new groups, assign points to groups, and modify these assignments as needed. Second, the operator can establish/modify adjacency between groups. The operator can establish adjacency between groups, e.g., group A is adjacent to group B. Third, the operator can establish/modify adjacency between points within a group. The operator can establish which points are adjacent to each other. At a minimum, after the operator has assigned all points to groups, the system and method can automatically build the adjacency relationship based on distance between the points. The operator can modify these relationships manually (add and remove adjacency relationships based on the requirements in assembly the workpiece). Distance is the minimum condition for adjacency. Another condition is that the adjacent point clamps the exit material of the considered point. This condition may be automatically determined. Fourth, the operator can set a minimum completion criterion for groups. For each group, the operator can assign a minimum completion criterion. This may be one of either minimum number of points completed or minimum percentage of points completed. Fifth, the operator can validate against a process control document ("PCD"), which is a document that contains all the requirements and rules for adjacency or work instructions. The system and method can check that the sequence of the points in the program does not violate the adjacency conditions for OUA. Sixth, the operator can optionally generate a suggested valid sequence within a group. It may be possible, given the adjacency conditions, to automatically traverse the adjacency graph and generate a suggested program sequence. If this is the case, then the automatically generated sequence should be able to be passed to FastTip, which is an offline programming software for point-to-point processing that is used by the NC programmers to write programs for automated processes, as a suggested base line program. Seventh, the system enables the operator to visually understand the adjacency relationships between points and groups when looking at the model. Eight, the system can provide and output that can be in addition to a manufacturing enhanced dataset ("MED"), wherein the files contain all the engineering information required for NC programming to process each point (fasteners or holes being drilled) and that includes the name of the group that the point belongs to and the adjacency list of points that are adjacent to this point. Additionally, a new data store can be used to store the groups and their adjacencies. The method can use the information from output to enforce the following rule during program execution: A hole can be drilled if it has no adjacent holes, any of the adjacent holes have a fastener, or all of the adjacent groups are sufficiently complete.

Reference is made to FIG. 1, which illustrates an automated facility 110 for assembling aircraft fuselages. The facility 110 includes an assembly floor 120. For example, the assembly floor 120 may include one or more thick concrete slabs with appropriate load bearing capability. The slabs may be relatively flat and smooth. Unlike a conventional assembly facility, the facility 110 does not have fuselage assembly jigs and fixtures secured to the assembly floor 120.

In some embodiments, the assembly floor 120 is large enough to accommodate multiple assembly areas or assembly cells. Within each assembly cell, a fuselage may be assembled. Multiple assembly cells allow multiple fuselages to be assembled at the same time. The facility 110 further includes a plurality of movable cradles, such as second cradles 130. Each cradle 130 is configured to support a fuselage keel structure and assemble a panelized fuselage in a single upright build position. A single upright build position of a panelized fuselage refers to a process that starts with a keel structure and adds panels upwards without changing orientation of the fuselage.

In some embodiments, each cradle 130 may be moved across the assembly floor 120 by an automated guided vehicle (AGV). In other embodiments, each cradle 130 may be moved across the assembly floor 120 by a crane or fork truck.

The facility 110 further includes a gantry 140 for moving fuselage panels and other structures across the assembly floor 120 to selected assembly cells. For instance, the gantry 140 may include cranes for picking up fuselage panels or floor grids at a first location, and placing the panels or floor grids onto cradles, such as second cradles 130, of selected assembly cells.

The facility 110 also includes a plurality of robots 150 for performing fuselage fastening operations. Examples of fuselage fastening operations include, but are not limited to, drilling, fastener insertion, and fastener termination.

The robots 150 are movable into position alongside second cradles 130 in selected cells. Consider an example in which first and second cradles 130 are in service for assembling first and second fuselages. Some robots 150 of the plurality are moved across the assembly floor 120 into position alongside first cradle, while other robots 150 of the plurality are moved across the assembly floor 120 into position alongside the second cradle 130. Still other robots 150 may be at other locations on the assembly floor 120. Still other robots may be located in storage or in a maintenance depot.

In some embodiments, each robot 150 may be moved across the assembly floor 120 by an automated guided vehicle (AGV). In other embodiments, each robot 150 may be moved across the assembly floor 120 by a combination of AGV and manual assisted vehicles (e.g., a crane, a fork truck). Either AGV or manual assisted vehicles may be used to move the robots 150 across the assembly floor 120 to a selected cell. (During operation, AGV is used to move the robots 150 along the length and circumference of a fuselage to complete drilling and fastening tasks in multiple zones.)

Some embodiments of the facility 110 may further include a control center 160 for controlling the placement, sequencing, and operation of the second cradles 130, gantry 140, and robots 150. The control center 160 may include a computer system and it may be located above the assembly floor 120 with a high view for operations personnel and camera systems to visually observe the assembly operations. The second cradles 130, gantry 140, robots 150 may communicate wirelessly with the control center 160. The control center 160 may also be responsible for controlling the robots 150 to avoid collisions and disruptions of automated manufacturing operations; determining when one robot 150 needs to be replaced with another robot 150 from the storage or maintenance depot; and making repair/replacement decisions on any non-conformances occurring during drilling/fastening operations on the fuselages.

In other embodiments, the second cradles 130, gantry 140 and robots 150 may be programmed with artificial intelligence, which enables these systems to perform certain operations autonomously. The autonomous operation reduces the burden of central control, and distributes some of the burden to the second cradles 130, gantry 140 and robots 150.

A controller may execute an NC program that commands the robot 150 to perform its operations. In some embodiments, the operations may include an one-up fastening process, which may be performed for each location along a splice. The one-up fastening process can be performed as follows. First, a splice structure is clamped up using, for instance, an electromagnet mounted on the robot's end effector and a steel plate on the opposite side of (inside) the fuselage. The steel plate may be positioned manually or robotically using key features on fuselage frames. In a one-up process, the clamp not only holds two or more parts together but also prevents interlaminar burr from getting caught in between the clamped parts. It also prevents leakage of seal from the clamped parts. Because no chips or burrs are caught between the clamped parts, the one-up process improves fatigue strength around the areas being joined. A hole is then drilled and countersunk. The drilled hole and countersink can then be inspected. A fastener is then inserted in the drilled hole. If the join is bolted, a sealant may also be applied. These steps may be performed robotically. The fastener is then terminated. For instance, if the fastener is a bolt, a collar and nut may be placed onto the threaded end of the bolt and tightened. If the fastener is a rivet, a bucking bar may be used to upset (or buck) the free end. The fastener termination may be performed robotically or manually. The splice structure is then declamped. Thereafter, the end effector is positioned at a new location along the splice. The above steps can then be repeated. Once all splices have been made in the robot's work envelope, the AGV moves the robot 150 along the fuselage to a new work envelope. Additional splices are performed in the new work envelope.

Figures 2A, 2B, 2C:
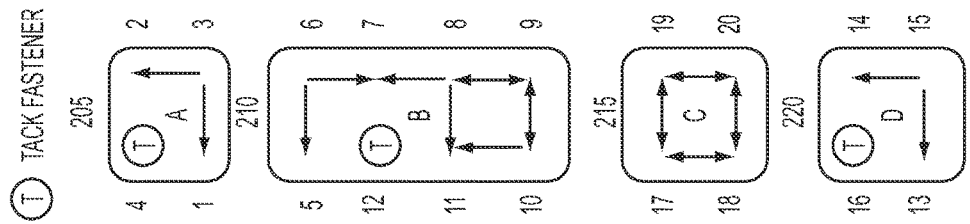
FIG. 2A shows a table with group names in a first column and an adjacency list in the second column for the four groups (A, B, C, D).
FIG. 2B shows a table with points names in a first column, group label in a second column, and an adjacency list in a third column for the table of FIG. 2A.
FIG. 2C shows adjacency graphs for the table of FIG. 2A.

FIGS. 2A-10B shows an example drilling sequence to drill the pattern shown in FIG. 2C, according to aspects of the present disclosure. In this example, adjacency is assumed to be horizontal and vertical, but not diagonal (shown as arrows). The sequence can be programmed by a NC programmer to drill holes from 1-20. In particular, FIG. 2A shows a table with group names in a first column and an adjacency list in the second column for the four groups (A, B, C, D) shown in FIG. 2C. As shown in FIG. 2C, adjacency graph for workpiece 205 that belongs to group A is shown and has four holes to be drilled (1, 2, 3, 4) and a tack fastener to be placed at point 4, adjacency graph for workpiece 210 that belongs to group B is shown and has eight holes to be drilled (5, 6, 7, 8, 9, 10, 11, 12) and a tack fastener to be placed at point 12, adjacency group for workpiece 215 that belongs to group C is shown and has four holes to be drilled (17, 18, 19, 20), and adjacency graph for workpiece 220 that belongs to group D is shown and has four holes to be drilled (13, 14, 15, 16) and a tack fastener to be placed to point 16. As shown in FIG. 2A, group B is adjacent to group A, groups A and C are adjacent to group B, groups B and D are adjacent to group C, and group C is adjacent to group D.

As shown in FIG. 2B, a table is shown with points names in a first column, group label in a second column, and an adjacency list in a third column. For the workpieces shown in FIG. 2C, point 1 is in group A and has no adjacent points, point 2 is in group A and has no adjacent points, point 3 is in group A and points 1 and 2 are adjacent to point 3, point 4 is in group A and has no adjacent points, point 5 is in group B and has no adjacent points, point 6 is in group B and points 5 and 7 are adjacent to point 6, point 7 is in group B and has no adjacent points, point 8 is in group B and points 7, 9, and 11 are adjacent to point 8, point 9 is in group B points 8 and 10 are adjacent to point 9, point 10 is in group B and points 9 and 11 are adjacent to point 10, point 11 is in group B and has no adjacent points, point 12 is in group B and has no adjacent points, point 13 is in group D and has no adjacent points, point 14 is in group D and has no adjacent points, point 15 is in group D and points 13 and 14 are adjacent to point 15, point 16 is in group D and has no adjacent points, point 17 is in group C and points 18 and 19 are adjacent to point 17, point 18 is in group C and points 17 and 20 are adjacent to point 18, point 19 is in group C and points 17 and 20 are adjacent to point 19, and point 20 is in group C and points 18 and 19 are adjacent to point 20.

FIG. 3A shows an example program display (or display) 300 for the sequence of FIGS. 2A-2C prior to any work is completed. The example display 300 comprises a sequence number listing 305, a respective command text description 310, and a respective status indictor 315. For example, the command text description 310 can include a line corresponding to each sequence in the drill operation and the status indicator 315 can include an indicator relating to the adjacency requirement being met. FIG. 3B shows each workpiece being worked on, the position of the tack fastener, and the location of the points for the holes to be drilled.

Figure 4A:
FIGS. 4A and 4B are similar to FIGS. 3A and 3B, and show the display 300 after the first hole is drilled and the status indicator updated.
Figure 4B:
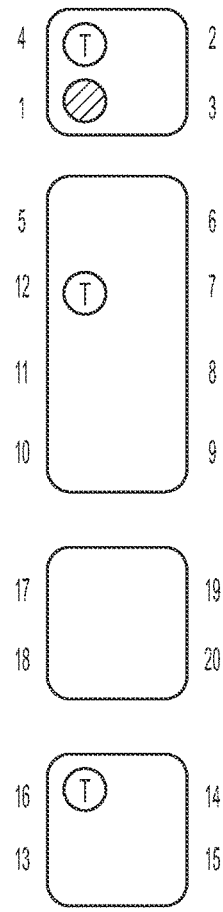

FIGS. 4A and 4B are similar to FIGS. 3A and 3B, and show the display 300 after the first hole is drilled and the status indicator 315 updated. After the hole #1 is drilled (point 1), an installed fastener indictor is shown complete at the respective position in FIG. 4B. After hole 1 is drilled, hole 3 is ready to be drilled. FIGS. 5A and 45 are similar to FIGS. 3A and 3B, and show the holes 1-5 has completed drilling. After hole 5 has been drilled, hole 6 is ready to be drilled. FIGS. 6A and 6B are similar to FIGS. 3A and 3B, and show that after attempting to drill hole 7, where no fastener installation occurred. As a result, the program will now jump to hole 11, since it is the next hole that meets its adjacency requirements. FIGS. 7A and 7B are similar to FIGS. 3A and 3B, and show that after drilling hole 11, holes 8 and 10 can now be drilled if the operator were to restart the program from the beginning. Alternatively, depending of the configuration of the software, this may not be necessary. FIGS. 8A and 8B are similar to FIGS. 3A and 3B, and show that after the operator starts the program over from the top and the second shear tie is finished. FIGS. 9A and 9B are similar to FIGS. 3A and 3B, and show that after hole 13 is drilled, hole 15 is now able to be drilled. FIGS. 10A and 10B are similar to FIGS. 3A and 3B, and show that after drilling hole 14, holes 17-20 can now be drilled since the adjacency groups are sufficiently fastened.

Figure 11:
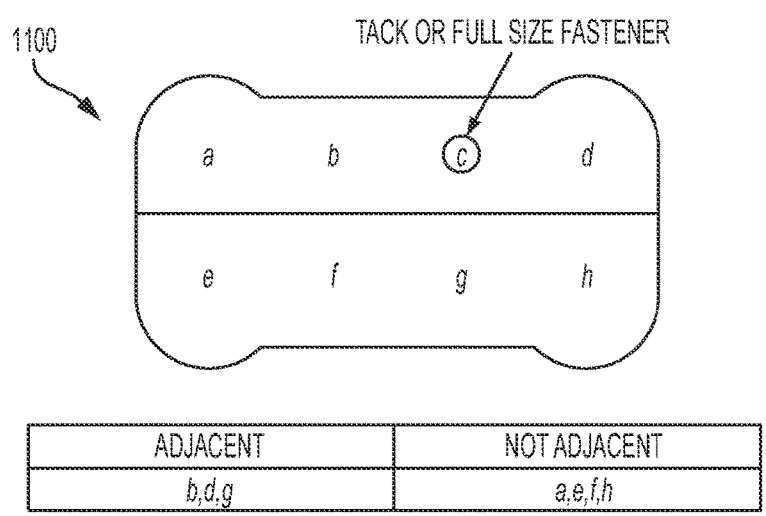
FIG. 11 shows an example adjacency example for a workpiece 1100 having points a-h, where point c's condition of assembly allows it to be considered an adjacency point (i.e., point c has a tack or full size fastener).
Figure 12:
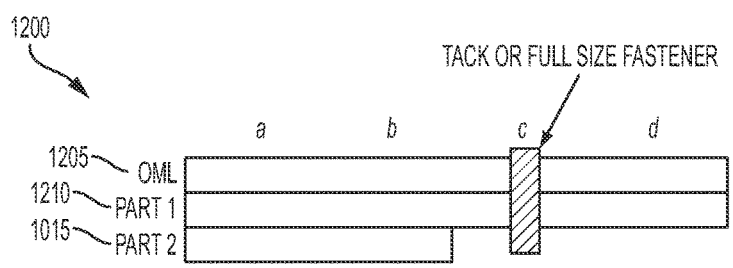
FIG. 12 shows an example exit layer adjacency for workpiece 1200 comprising a outer mold line ("OML") (or exterior surface of the fuselage skin) layer 1205, part 1 layer 1210, and part 2 layer 1215 and having points a-d, where point c has a tack or full fastener
Figure 13:
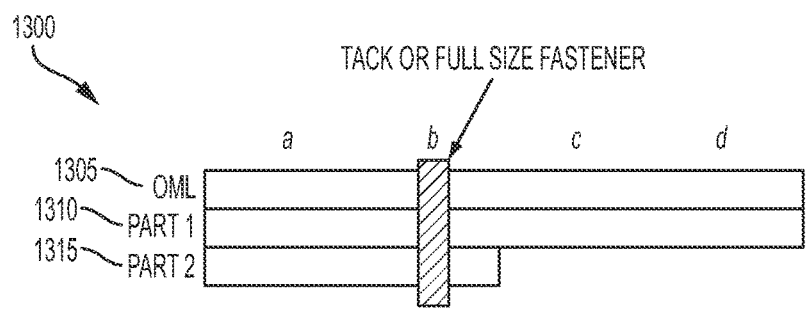
FIG. 13 shows another example exit layer adjacency for workpiece 1300 comprising a OML layer 1305, part 1 layer 1310, and part 2 layer 1315 and having points a-d, where point b has a tack or full fastener.

FIG. 11 shows an example adjacency example for a workpiece 1100 having points a-h, where point c has a tack or full size fastener. Thus, for the workpiece 1100 with a fastener located at point c, points b, d, g, are adjacent to point c and points a, e, f, h are not adjacent to point c. In the example of FIG. 11, in order to drill a point within a group that includes a permanently installed full size fastener or tack fastener, the following requirements must be met. First, the point must be adjacent to a permanently installed full size fastener or tack fastener. Adjacency is met by fasteners that are in line with or perpendicular to the dominant linear direction of the hole pattern. Diagonally opposite (caddy-corner) of the point is not considered adjacent. A tack fastener is not sufficient for a metallic stack-up. Only completed installations count as adjacent clamp-up. Second, the exit layer of the point must be continuous within the stack-up of the adjacent fastener, as shown in FIGS. 12 and 13. Lowboys, which are multiple pieces bolted together and forming a consistent surface without a gap, or similar parts attached with full sized fasteners can be considered the same exit layer.

FIG. 12 shows an example exit layer adjacency for workpiece 1200 comprising a OML layer 1205, part 1 layer 1210, and part 2 layer 1215 and having points a-d, where point c has a tack or full fastener. For points a and b, the exit layers are layers 1205 and 1215 and for points c and d, the exit layers are layers 1205 and 1210. Thus, for the workpiece 1200 with a fastener located at point c, pointd is adjacent to point c and points a and b are not adjacent to point c.

FIG. 13 shows another example exit layer adjacency for workpiece 1300 comprising a OML layer 1305, part 1 layer 1310, and part 2 layer 1315 and having points a-d, where point b has a tack or full fastener. For points a and b, the exit layers are layers 1305 and 1315 and for points c and d, the exit layers are layers 1305 and 1310. Thus, for the workpiece 1300 with a fastener located at point b, points a and c are adjacent to point b and point d is not adjacent to point b.

Figure 14:
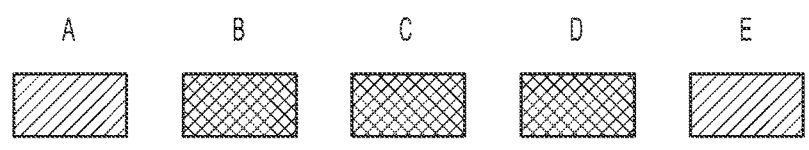
FIG. 14 shows an example of group adjacency example for groups A-E, with groups A and E sufficiently complete and groups B-D not sufficiently complete, groups B and D having adjacency requirements met and group C does not have adjacency requirement met.
Figure 15:
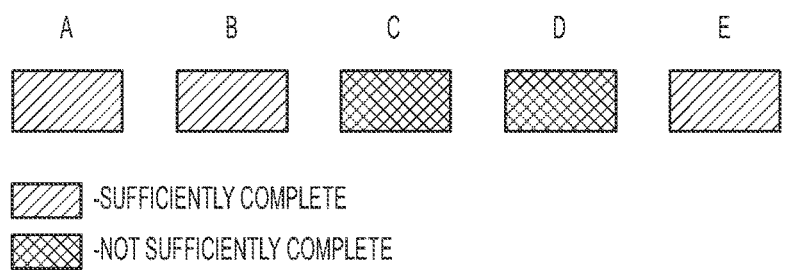
FIG. 15 shown another example group adjacency example for groups A-E, with groups C and D not sufficiently complete and having adjacency requirements met and groups A, B, and E sufficiently complete.
Figure 16:
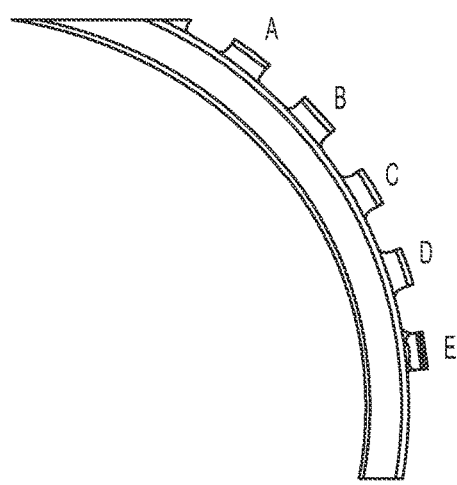
FIG. 16 shows an example end of part assembly example.

FIG. 14 shows an example of group adjacency example for groups A-E, with groups A and E sufficiently complete and groups B-D not sufficiently complete, groups B and D having adjacency requirements met and group C does not have adjacency requirement met. FIG. 15 shown another example group adjacency example for groups A-E, with groups C and D not sufficiently complete and having adjacency requirements met and groups A, B, and E sufficiently complete. FIG. 16 shows an example end of part assembly example. If the group does not include a permanently installed full size fastener or tack fastener, the following requirements are needed. First, the adjacent groups have been sufficiently complete, as shown in FIGS. 14 and 15. Adjacent groups are the closest group on both sides that include a permanently installed full size fastener or tack fastener. Sufficiently complete is at least 50%, at least 75%, or at least 90%, or other predetermined thresholds based on the present conditions of the fasteners in the group. Shear ties at the end of a frame assembly must have a tack fastener or full size fastener. For the arrangement shown in FIG. 16, group E would not be able to be drilled unless it includes a tack fastener or permanently installed full size fastener. Second, the first hole must start at one of the middle fasteners in the group.

Figure 17:
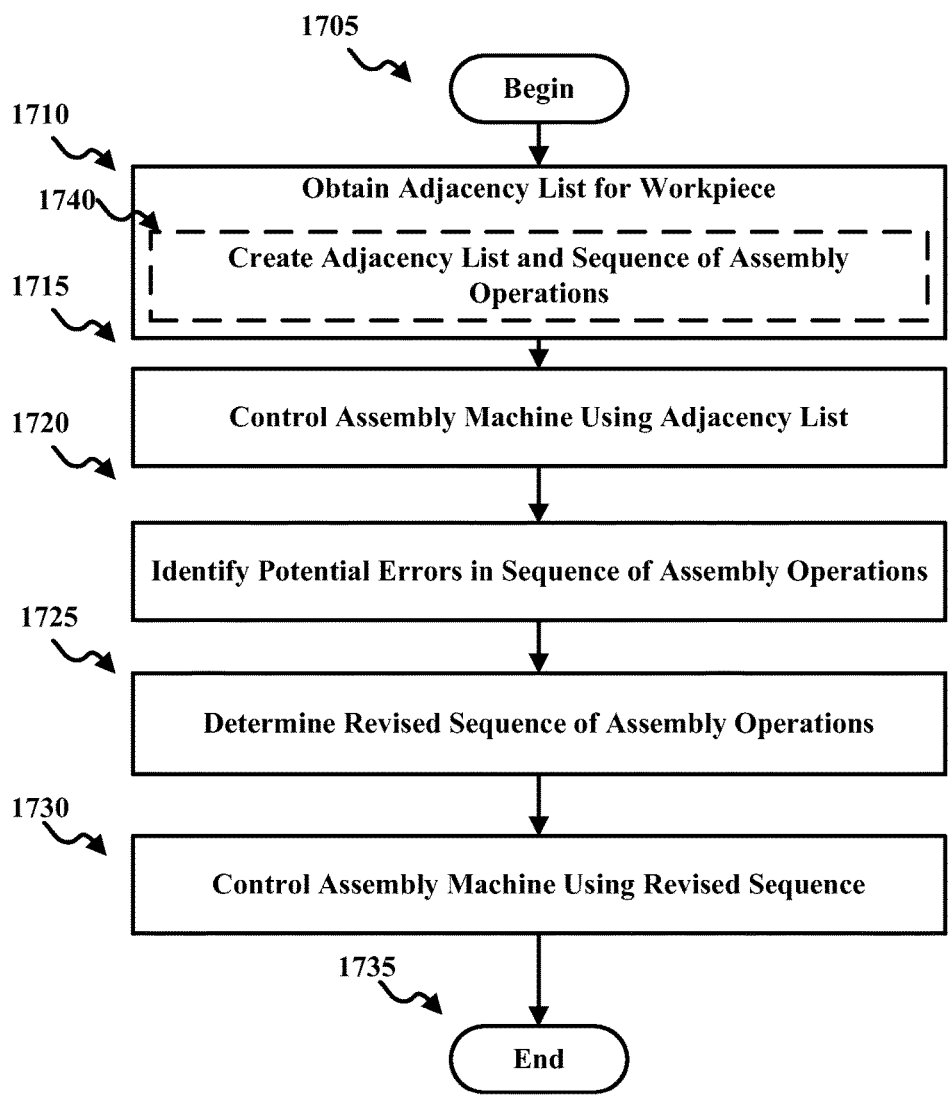
FIG. 17 shows a method for automating an assembling sequence operation for a workpiece using an one-up assembly process that uses adjacent hole clamping, according to aspects consistent with the present disclosure.

FIG. 17 shows a method for automating an assembling sequence operation for a workpiece using an one-up assembly process that uses adjacent hole clamping, according to aspects consistent with the present disclosure. The method begins at 1705, and at 1710, an adjacency list is obtained from points for the workpiece to be assembled. For example, an adjacency list as shown in FIGS. 2A and 2B for the workpiece comprising the components shown in FIG. 2C can be obtained based, at least in part, on the assembly requirements for the workpiece. The adjacency list can be based on distance between the points, a stack-up arrangement of the workpiece, process requirements of the workpiece, adjacency relative to a hole in the workpiece having a fastener or a hole having clamping sufficient to maintain a position of the workpiece, or combinations thereof. The adjacency list can be obtained by identifying the points assigned to a computer-aided design software. Alternatively, at 1740, the adjacency list and the sequence of assembly operations can be created, as discussed above, by at least assigning points to be assembled on the workpiece to groups and establishing adjacency between the groups that are assigned. At 1715, an assembly machine for assembling the workpiece is controlled using a sequence of assembly operations based on the adjacency list. For example, the machine, as shown in FIG. 1, can be operable to perform drilling and fastening operations for the workpiece. At 1720, potential errors in the sequence of assembly operations are identified. The potential errors comprise an incomplete, absence of parts, or inaccurate drilling or fastening operation. For example, as shown in FIGS. 6A and 6B, the errors identified are due to an incomplete installation of a fastener. At 1725, a revised sequence of assembly operations is determined based on the potential errors that are identified. As shown in FIGS. 7A and 7B, a revised sequence of operations is determined based on the incomplete fastener at hole 7 while still maintaining the required adjacency requirements. At 1730, the assembly machine is controlled based on the revised sequence of assembly operations. At 1735, the method can end.

Thus, the different advantageous embodiments provide a method and apparatus for performing operations on a workpiece. One or more of the different advantageous embodiments may be used to perform one of the assembly processes on workpieces that may be for structures, such as a wing of an aircraft, a horizontal stabilizer, a vertical stabilizer, a fuselage, or some other suitable type of structure.

The foregoing description is illustrative, and variations in configuration and implementation can occur to persons skilled in the art. For instance, the various illustrative logics, logical blocks, modules, components and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more examples, the functions and operations described can be implemented in hardware, software, firmware, or any combination thereof. For a software implementation, the techniques described herein can be implemented with modules (e.g., procedures, functions, subprograms, programs, routines, subroutines, components, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 18:
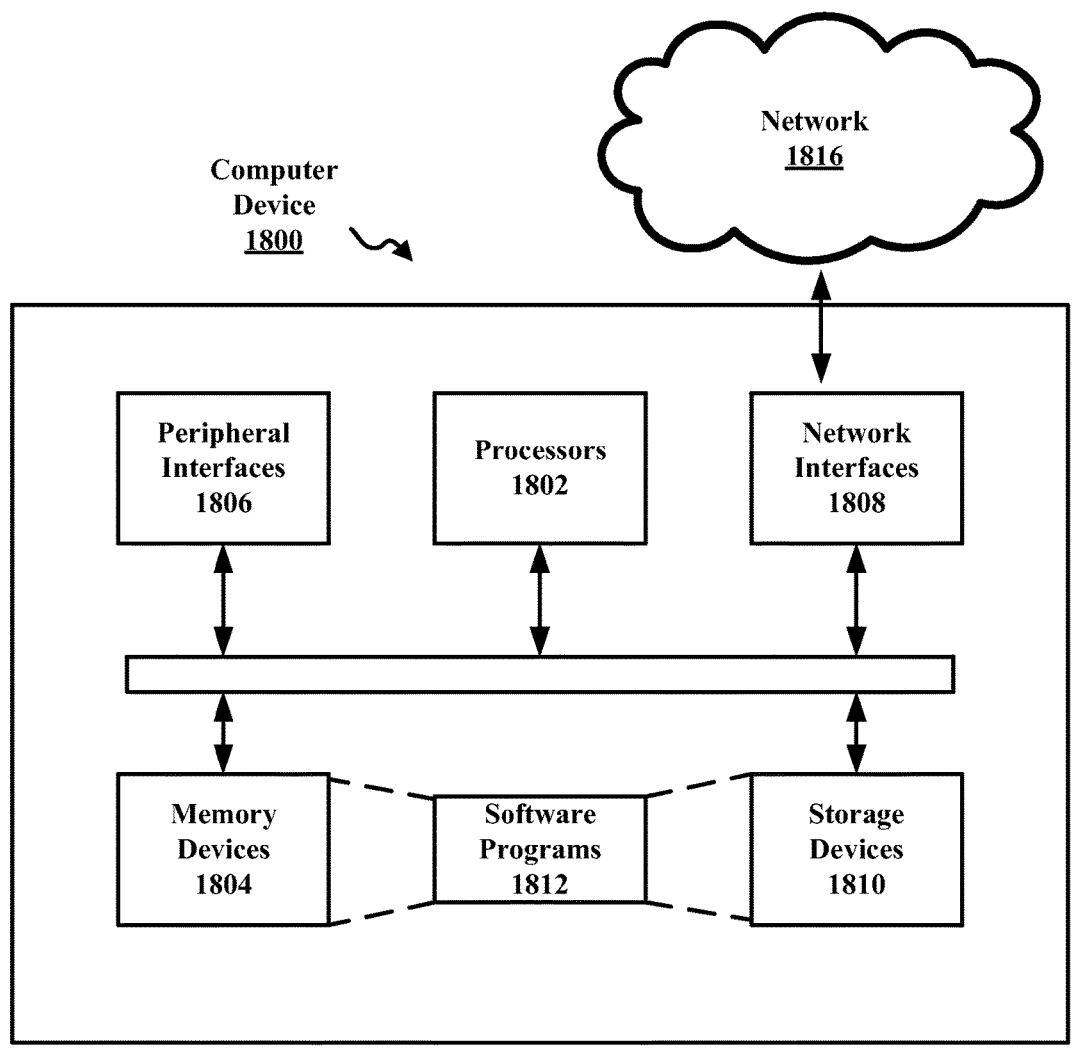
FIG. 18 illustrates an example of a hardware configuration for a computer device that can be used to perform one or more of the processes, functions, frameworks, modules, threads, objects, or operations described herein.

For example, FIG. 18 illustrates an example of a hardware configuration for a computer device 1800 that can be used to perform one or more of the processes, functions, frameworks, modules, threads, objects, or operations described above. While FIG. 18 illustrates various components contained in the computer device 1800, FIG. 18 illustrates but one example of a computer device and additional components can be added and existing components can be removed.

The computer device 1800 can be any type of computer devices, such as desktops, laptops, servers, etc., or mobile devices, such as smart telephones, tablet computers, cellular telephones, personal digital assistants, etc. As illustrated in FIG. 18, the computer device 1800 can include one or more processors 1802 of various core configurations and clock frequencies. The computer device 1800 can also include one or more memory devices 1804 that may be non-transitory and that may serve as a main memory during the operation of the computer device 1800. For example, during operation, a copy of the software (e.g., 1812) that implements the above-described features, operations, functions, or methods can be stored in the one or more memory devices 1804. The computer device 1800 can also include one or more peripheral interfaces 1806, such as keyboards, mice, touchpads, computer screens, touchscreens, etc., for enabling human interaction with and manipulation of the computer device 1800.

The computer device 1800 can also include one or more network interfaces 1808 for communicating via one or more networks 1816, such as Ethernet adapters, wireless transceivers, or serial network components, for communicating over wired or wireless media using protocols. The computer device 1800 can also include one or more storage device 1810 of varying physical dimensions and storage capacities, such as flash drives, hard drives, random access memory, etc., for storing data, such as images, files, and program instructions for execution by the one or more processors 1802. The storage device 1810 may include a non-transitory storage medium.

Additionally, the computer device 1800 can include one or more software programs 1812 that enable the functionality of the features described herein. The one or more software programs 1812 can include instructions that cause the one or more processors 1802 to perform the processes, functions, and operations described herein. Copies of the one or more software programs 1812 can be stored in the one or more memory devices 1804 and/or on in the one or more storage devices 1810. Likewise, the data utilized by one or more software programs 1812 can be stored in the one or more memory devices 1804 and/or on in the one or more storage devices 1810.

In various implementations, the computer device 1800 can communicate via a network 1816. The network 1816 can be any type of network, such as a local area network, a wide-area network, a virtual private network, the Internet, an intranet, an extranet, a public switched telephone network, an infrared network, a wireless network, and any combination thereof. The network 1816 can support communications using any of a variety of commercially-available protocols, such as TCP/IP, UDP, OSI, FTP, UPnP, NFS, CIFS, AppleTalk, and the like.

The computer device 1800 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 1800 as described above need not be enclosed within a single enclosure or even located in close proximity to one another. Those skilled in the art will appreciate that the above-described componentry are examples only, as the computer device 1800 can include any type of hardware componentry, including any necessary accompanying firmware or software, for performing the disclosed implementations. The computer device 1800 can also be implemented in part or in whole by electronic circuit components or processors, such as application-specific integrated circuits (ASICs) or field-programmable gate arrays (FPGAs).

If implemented in software, the processes, methods, functions, and operations described herein can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

What is claimed is:

1. A method for automating an assembling sequence operation for a workpiece using an one-up assembly process that uses adjacent hole clamping, the method comprising:
   determining a location on the workpiece to be secured sufficiently to maintain a position of the workpiece during assembling;
   creating an adjacency list from points for the workpiece to be assembled based on an adjacency to the location that is determined;
   controlling an assembly machine for assembling the workpiece using a sequence of assembly operations based on the adjacency list in the one-up assembly process that uses adjacent hole clamping;
   identifying potential errors in the sequence of assembly operations;
   determining a revised sequence of assembly operations based on the potential errors that are identified; and
   controlling the assembly machine based on the revised sequence of assembly operations.

2. The method of claim 1, wherein the creating the adjacency list and the sequence of assembly operations further comprises:
   assigning points to be assembled on the workpiece to groups; and
   establishing adjacency between the groups that are assigned.

3. The method of claim 1, wherein the assembly machine is operable to perform drilling and fastening operations.

4. The method of claim 1, wherein the adjacency list is based on distance between the points, a stack-up arrangement of the workpiece, process requirements of the workpiece, or combinations thereof.

5. The method of claim 1, wherein the creating the adjacency list further comprises identifying the points assigned to a computer-aided design software.

6. The method of claim 1, wherein the potential errors comprise an incomplete, absence of parts, or inaccurate drilling or fastening operation.

7. The method of claim 1, wherein the adjacency list is created based on a computer-aided design software depiction of the workpiece.

8. A device comprising:
   a memory containing instructions; and
   at least one processor, operably connected to the memory, that executes the instructions to perform method for automating an assembling sequence operation for a workpiece using an one-up assembly process that uses adjacent hole clamping, the method comprising:
   determining a location on the workpiece to be secured sufficiently to maintain a position of the workpiece during assembling;
   creating an adjacency list from points for the workpiece to be assembled based on an adjacency to the location that is determined;
   controlling an assembly machine for assembling the workpiece using a sequence of assembly operations based on the adjacency list in the one-up assembly process that uses adjacent hole clamping;
   identifying potential errors in the sequence of assembly operations;
   determining a revised sequence of assembly operations based on the potential errors that are identified; and controlling the assembly machine based on the revised sequence of assembly operations.

9. The device of claim 8, wherein the creating the adjacency list and the sequence of assembly operations further comprises:
assigning points to be assembled on the workpiece to groups; and
establishing adjacency between the groups that are assigned.

10. The device of claim 8, wherein the assembly machine is operable to perform drilling and fastening operations.

11. The device of claim 8, wherein the adjacency list is based on distance between the points, a stack-up arrangement of the workpiece, process requirements of the workpiece, or combinations thereof.

12. The device of claim 8, wherein the creating the adjacency list further comprises identifying the points assigned to a computer-aided design software.

13. The device of claim 8, wherein the potential errors comprise an incomplete, absence of parts, or inaccurate drilling or fastening operation.

14. The device of claim 8, wherein the adjacency list is created based on a computer-aided design software depiction of the workpiece.

15. A computer readable storage medium comprising instructions for causing one or more processors to perform a method, the method for automating an assembling sequence operation for a workpiece using an one-up assembly process that uses adjacent hole clamping, the method comprising:
determining a location on the workpiece to be secured sufficiently to maintain a position of the workpiece during assembling;
creating an adjacency list from points for the workpiece to be assembled based on an adjacency to the location that is determined;
controlling an assembly machine for assembling the workpiece using a sequence of assembly operations based on the adjacency list in the one-up assembly process that uses adjacent hole clamping;
identifying potential errors in the sequence of assembly operations;
determining a revised sequence of assembly operations based on the potential errors that are identified; and
controlling the assembly machine based on the revised sequence of assembly operations.

16. The computer readable storage medium of claim 15, wherein the creating the adjacency list and the sequence of assembly operations further comprises:
assigning points to be assembled on the workpiece to groups; and
establishing adjacency between the groups that are assigned.

17. The computer readable storage medium of claim 15, wherein the assembly machine is operable to perform drilling and fastening operations.

18. The computer readable storage medium of claim 15, wherein the adjacency list is based on distance between the points, a stack-up arrangement of the workpiece, process requirements of the workpiece, or combinations thereof.

19. The computer readable storage medium of claim 15, wherein the creating the adjacency list further comprises identifying the points assigned to a computer-aided design software.

20. The computer readable storage medium of claim 15, wherein the potential errors comprise an incomplete, absence of parts, or inaccurate drilling or fastening operation.

21. The computer readable storage medium of claim 15, wherein the adjacency list is created based on a computer-aided design software depiction of the workpiece.

* * * * *